F. L. TEMPLE.
MECHANICAL MOVEMENT.
APPLICATION FILED OCT. 30, 1908.

944,978.

Patented Dec. 28, 1909.
3 SHEETS—SHEET 1.

Witnesses
Hugh H. Ott

Inventor
Floyd L. Temple
By Victor J. Evans
Attorney

F. L. TEMPLE.
MECHANICAL MOVEMENT.
APPLICATION FILED OCT. 30, 1908.

944,978.

Patented Dec. 28, 1909.
3 SHEETS—SHEET 2.

Witnesses

Inventor
Floyd L. Temple
By Victor J. Evans
Attorney

F. L. TEMPLE.
MECHANICAL MOVEMENT.
APPLICATION FILED OCT. 30, 1908.
944,978.
Patented Dec. 28, 1909.
3 SHEETS—SHEET 3.
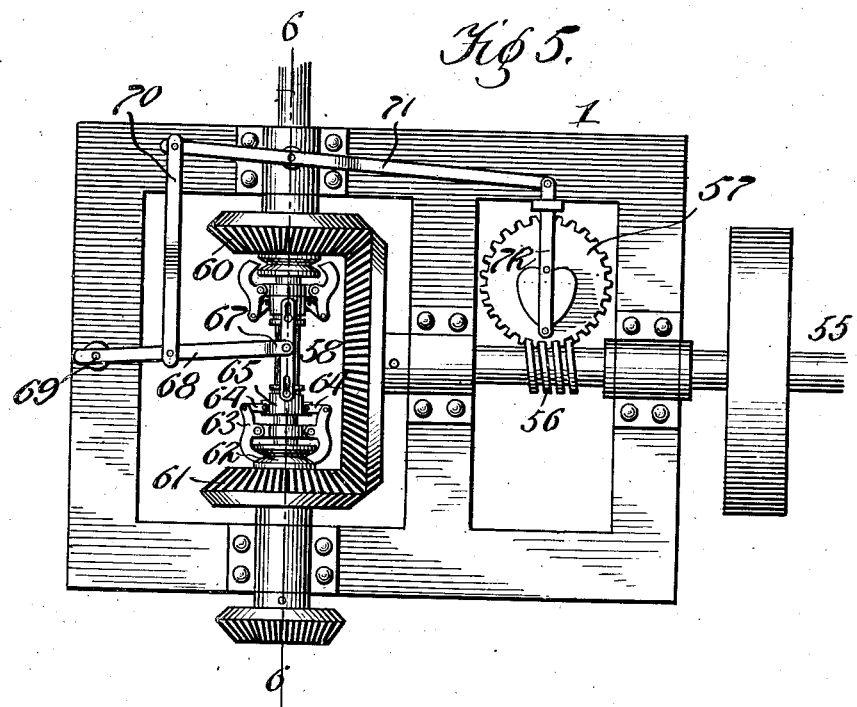
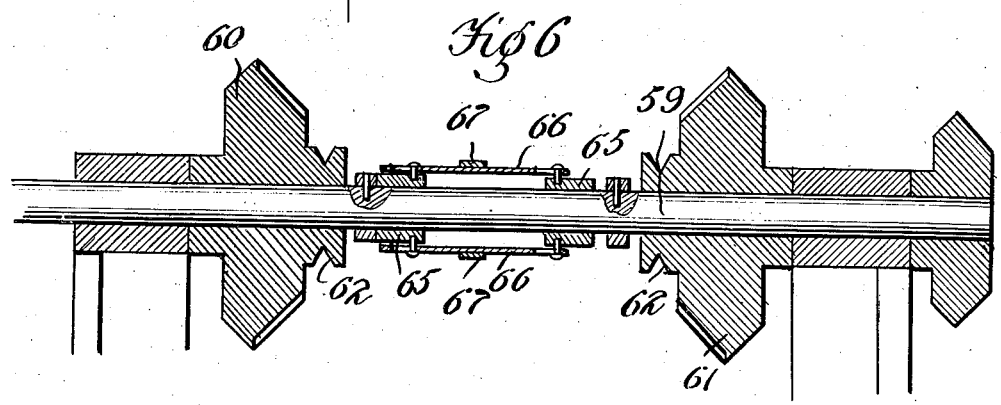
Witnesses
Hugh H. Ott
Jan. A. Loehr
Inventor
Floyd L. Temple
By Victor J. Evans
Attorney

UNITED STATES PATENT OFFICE.

FLOYD L. TEMPLE, OF TERRE HAUTE, INDIANA.

MECHANICAL MOVEMENT.

944,978.

Specification of Letters Patent.   Patented Dec. 28, 1909.

Application filed October 30, 1908.   Serial No. 460,276.

*To all whom it may concern:*

Be it known that I, FLOYD L. TEMPLE, a citizen of the United States, residing at Terre Haute, in the county of Vigo and State of Indiana, have invented new and useful Improvements in Mechanical Movements, of which the following is a specification.

This invention relates to mechanical movements, and has for an object to provide a mechanism of this character which may be effectively used in connection with various laundry machines, which will be particularly desirable when used in connection with washing machines for the reason of the fact that it will automatically impart to a driven shaft alternating rotary movements.

A further object of this invention is to provide a mechanism of the character set forth including a drive shaft, a driven shaft, a friction gear upon the drive shaft and a friction gear upon the driven shaft, and to provide novel automatic means for shifting the friction gear upon the driven shaft to engage the same frictionally at different points upon the working face of the friction gear upon the drive shaft.

Other objects and advantages will be apparent as the nature of the invention is better set forth, and it will be understood that changes within the scope of the claims may be resorted to without departing from the spirit of the invention.

Figure 1:
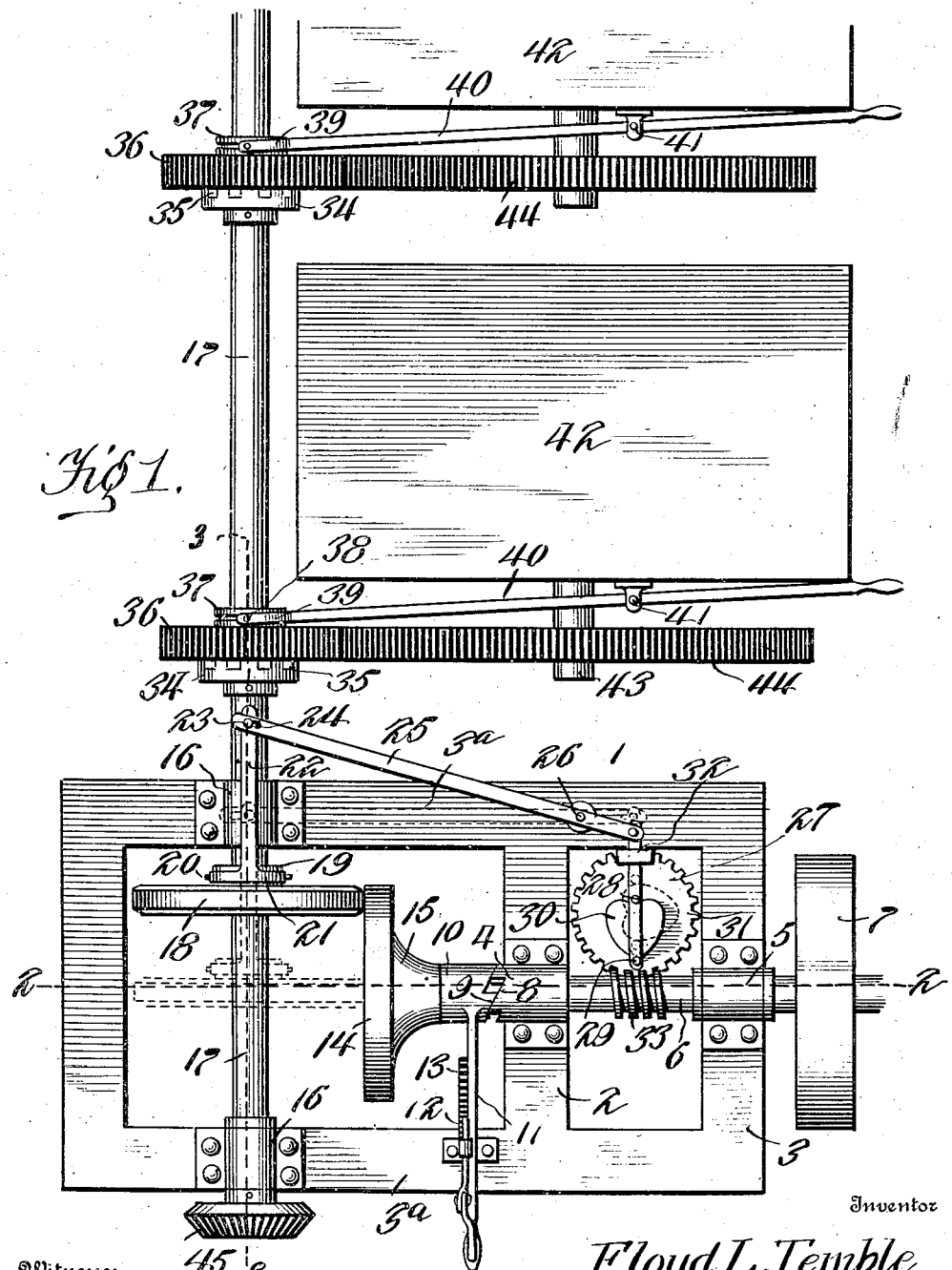
Figure 2:
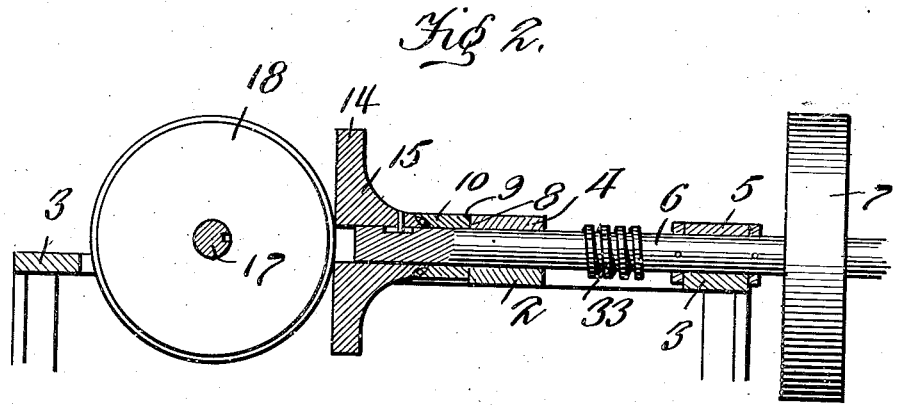
Figure 3:
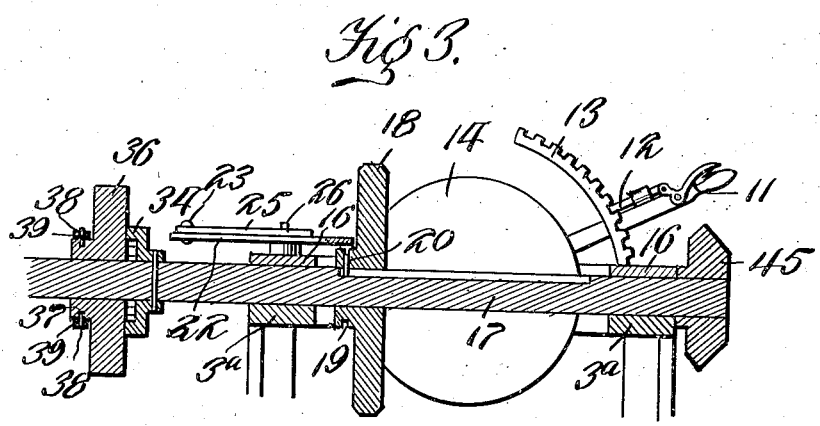
Figure 4:
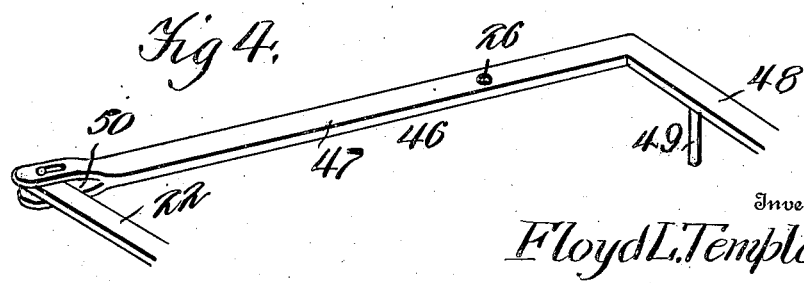

In the drawings, forming a portion of this specification and in which like numerals of reference indicate similar parts in the several views:—Figure 1 is a top plan view of the mechanism showing its application to a series of washing machines, Fig. 2 is a detail section taken on the line 2—2 of Fig. 1, Fig. 3 is a detail section taken on the line 3—3 of Fig. 1, Fig. 4 is a detail perspective view of a modified form of cam actuated lever. Fig. 5 is a view similar to Fig. 1 showing a slightly modified form of my invention. Fig. 6 is a section taken on the line 6—6 of Fig. 5.

Referring now more particularly to the drawings, there is shown a frame 1 which is preferably of rectangular form and which as will be obviously understood can be provided with any suitable supporting means such as commonly constructed legs or the like for holding the said frame in proper spaced relation with respect to the floor upon which it is mounted. The frame is preferably of hollow construction but is provided with an intermediate cross bar 2 located adjacent to one of the end bars 3 of the said frame. The cross bar 2 has mounted thereon a hollow journal box 4 and the end bar 3 at the right of the said bar 2 is provided with a similar journal box 5 disposed directly in line with the box 4 as clearly seen upon reference to the drawings. The boxes 4 and 5 are thus located to receive a drive shaft 6 provided upon one end with a band pulley 7 to be belted to a suitable motor. While a band pulley is incidently shown as means for imparting motion to the shaft 6 it is obvious that a motor of suitable form may be applied or connected directly to the shaft 6, or the said shaft may be driven in any suitable manner. The box 4 is provided with an annular series of cam faces 8 adapted to be engaged with correspondingly shaped cam faces 9 upon an element or collar 10 rotatably mounted upon the shaft 6. The element or collar 10 has secured thereto an operating handle 11 which carries a pawl 12 to engage the teeth of a rack bar 13 upon the frame 1. A slidably mounted friction disk or gear 14 is carried by the shaft 6 and is provided with a hub 15 the end face of which being adapted to engage one of the end faces of the element or collar 10 as will be clearly seen upon reference to Fig. 1 of the drawings.

The longitudinal bars 3ᵃ of the frame 1 have supported thereon journal boxes 16 disposed in line with each other and receive a driven shaft 17 which is thus located at right angles to the shaft 6. The just described shaft has mounted thereon for sliding movement a friction disk or gear 18 the peripheral edge of which being adapted to engage the flat face of the disk 14 upon the shaft 6. A grooved hub 19 is carried by the disk 18 and receives pins 20 of a fork 21 carried by an arm 22 as shown. The arm 22 has projecting therefrom a pin 23 disposed in a slot 24 formed in the outer end of a lever 25. The said lever 25 is pivotally mounted midway between its ends to the frame 1 as indicated at 26. The lever 25 has pivotally mounted thereto at its end opposite to the pin 23 an arm 27 from which depends pins 28 and 29 disposed in spaced relation to each other and receives therebetween a cam 30 upon a horizontally disposed gear 31. The arm 27 is guided in its movement by means of a guide bracket 32.

A worm 33 is formed upon the shaft 6 and meshes with the teeth of the gear 31.

The shaft 17 has secured thereto clutch elements 34 adapted to be engaged with clutch teeth 35 upon pinions 36. The pinions 36 are provided with grooved collars 37 to receive the pins 38 carried by the forked ends 39 of operating levers 40 pivotally mounted as indicated at 41 to washing machine bodies 42. Each washing machine is provided with a shaft 43 upon which is fixed a gear wheel 44. From the construction just described it will be seen that upon operation of the levers 40 the gears 46 which are slidably mounted upon the shaft 17 may be thrown into or out of operation with the gear wheels 44.

In a brief description of the operation of the mechanism herein set forth and described it will be seen that when the disk 18 is frictionally engaged with the disk 14 motion will be imparted to the shaft 17, and by provision of the worm 36 and the gear 31 the cam 30 will reciprocate the arm 27, consequently rocking the lever 27 to continuously slide the friction disk 18 upon the shaft 17 and across the flat face of the disk 14 to impart to the shaft 17 opposite rotary movement. The mechanism or mechanical movement herein described is extremely simple in construction, and while the said movement is particularly desirable for use in transmitting power to the driven elements of washing machines it is obvious that the said movement may be used for driving various laundry machines or for imparting alternating rotary motion to any desired elements. The description of the shaft 17 and the gears 36 carried thereby is such that a plurality of washing machines may be simultaneously operated, and to provide means so that a single machine may be operated I provide at one end of the shaft 17 a beveled pinion 45.

In Fig. 4 of the drawings is shown an angle lever 46 comprising an arm 47 and a short arm 48 the said arms being formed integral with each other and may be used in lieu of the lever 25 and the arm 27 as described in the preferred form of my invention. The arm 48 of the said lever 46 carries depending pins 49 for coöperation with the cam 30. At the outer extremity the arm 47 is forked as shown at 50 and pivotally receives therebetween the arm 22.

Referring now more particularly to Figs. 5 and 6 of the drawings, the frame 1 is provided with a drive shaft 55 having a worm 56 to mesh with the gear wheel 57 as hereinbefore described. In this form of my invention I omit the friction disk 14, and provide a bevel gear 58 which is thus disposed in parallel relation to the driven shaft 59 having loosely mounted thereon bevel pinions 60 and 61. Each of the said pinions is provided with a grooved collar 62 adapted to receive pivoted clutch fingers 63 connected by means of links 64 to a sliding element 65. The element 65 for each set of fingers for the pinions 60 and 61 are identical and are connected with each other by means of slotted elements 66 which receive the forked end 67 of a lever 68 pivoted as at 69 to the frame 1. The said lever 68 is connected by means of a lever 70 to a rocking element 71 connected to an arm 72 identical to the arm 27 described in the preferred form of my invention. It will be seen, upon reference to Figs. 5 and 6 of the drawings, that as the arm 72 is actuated to slide in a manner described in the preferred form it is obvious that a rocking movement will be imparted to the arm 68.

I claim:

1. In mechanism of the class described, a drive shaft, a driven shaft, a friction wheel upon the drive shaft, a sliding friction wheel upon the driven shaft adapted to be frictionally engaged upon its peripheral edge with one face of the friction wheel upon the drive shaft, a cam actuated upon movement of the drive shaft, and means connecting the cam with the friction wheel upon the driven shaft so that the said wheel can be automatically shifted upon the shaft to impart through its engagement with the friction wheel upon the drive shaft alternating rotary motion to the driven shaft.

2. Mechanism of the class described comprising a drive shaft, a driven shaft, a friction wheel upon the drive shaft, a friction wheel slidably mounted upon the driven shaft adapted to engage the friction wheel upon the drive shaft, a rock lever, connections between the rock lever and the wheel upon the driven shaft, and means operable upon movement of the drive shaft for actuating said lever.

3. In mechanism of the class described, a drive shaft, a friction gear thereon, a driven shaft, a slidable friction wheel upon the driven shaft adapted to be engaged with the wheel upon the drive shaft, and cam actuated means for automatically shifting the wheel upon the driven shaft so that it may be engaged at different points upon the friction wheel carried by the drive shaft to impart to the driven shaft an alternating rotary movement.

4. Mechanism of the class described comprising a drive shaft, a driven shaft, a friction disk upon the drive shaft, a friction disk slidably mounted upon the driven shaft, and means actuated by the drive shaft for moving the disk upon the driven shaft across the face of the disk upon the drive shaft.

5. Mechanism of the class described comprising a drive shaft, a friction disk upon the shaft, a driven shaft, a friction disk upon the driven shaft, and means actuated by the drive shaft for moving the disk upon the driven shaft across the face of the disk upon the drive shaft to impart to the driven shaft an alternating rotary movement.

6. Mechanism of the class described comprising a driving friction disk, a second disk adapted to contact the first named disk, and cam actuated means for moving the second disk across the face of the first disk to impart thereto alternating rotary movement.

7. Mechanism of the class described comprising a drive shaft, a driven shaft, a sliding friction wheel upon the driven shaft, a sliding friction wheel upon the drive shaft, means for moving the wheel upon the drive shaft toward or away from the wheel upon the driven shaft, a lever, connections between the lever and the wheel upon the driven shaft, a sliding arm connected with the lever, and means operable upon movement of the drive shaft for actuating the sliding arm to impart rocking movement to the lever so that the friction wheel upon the driven shaft can be moved across the face of the wheel upon the drive shaft.

8. In mechanism of the class described, a driven shaft, gearing upon said shaft, driving gearing, a worm actuated upon operation of the driving gearing, a gear in mesh with said worm, a cam upon said gear, and cam controlled means operatively connected with the said driven gearing whereby the said driven and driving gearing will coöperate to impart to the driven shaft alternating rotary movement.

9. Mechanism of the class described comprising drive and driven shafts, a cam actuated rock lever operable upon movement of the drive shaft, gearing upon the drive shaft, gearing upon the driven shaft, and means actuated upon movement of the rock lever for causing the gearing upon the driven shaft to co-act with the gearing upon the drive shaft so that alternating rotary movement is imparted to the driven shaft and simultaneously varying the speed of said shaft.

In testimony whereof I affix my signature in presence of two witnesses.

FLOYD L. TEMPLE.

Witnesses:
GEO. E. BERCAW,
CHARLES E. TEMPLE.